United States Patent
Remy et al.

(10) Patent No.: US 9,464,573 B2
(45) Date of Patent: Oct. 11, 2016

(54) METHOD FOR OPERATING A GAS TURBINE ENGINE, POWER SUPPLYING DEVICE FOR CONDUCTING SUCH METHOD AND AIRCRAFT USING SUCH METHOD

(75) Inventors: Sebastien Remy, Cazeres (FR); Jean Botti, Paris (FR)

(73) Assignee: Airbus SAS, Blagnac (FR)

( * ) Notice: Subject to any disclaimer, the term of this patent is extended or adjusted under 35 U.S.C. 154(b) by 1322 days.

(21) Appl. No.: 12/679,821

(22) PCT Filed: Sep. 24, 2008

(86) PCT No.: PCT/EP2008/008095
§ 371 (c)(1),
(2), (4) Date: Jun. 10, 2010

(87) PCT Pub. No.: WO2009/040112
PCT Pub. Date: Apr. 2, 2009

(65) Prior Publication Data
US 2010/0293959 A1    Nov. 25, 2010

Related U.S. Application Data

(63) Continuation of application No. 11/861,014, filed on Sep. 25, 2007, now Pat. No. 8,056,344.

(30) Foreign Application Priority Data

Feb. 12, 2008    (EP) .................................... 08151335

(51) Int. Cl.
*F02C 7/22*      (2006.01)
*F02C 9/26*      (2006.01)
(Continued)

(52) U.S. Cl.
CPC . *F02C 7/22* (2013.01); *F02C 3/22* (2013.01); *F02C 3/30* (2013.01); *F02C 9/26* (2013.01);
(Continued)

(58) Field of Classification Search
CPC . F02C 6/18; F02C 3/20–3/34; F02C 7/1435; F02C 9/26; F02C 9/28; F02C 9/40; F05D 2270/08
USPC ...... 60/772, 780, 781, 39.461, 39.463, 39.3, 60/39.53
See application file for complete search history.

(56) References Cited

U.S. PATENT DOCUMENTS 5,394,685 A *   3/1995  Kesten et al. ................... 60/780
5,852,927 A *  12/1998  Cohn et al. ...................... 60/780
(Continued)

FOREIGN PATENT DOCUMENTS

DE    43 39 094 A1    5/1995
DE    199 11 018 C1   8/2000
(Continued)

OTHER PUBLICATIONS

Notification of Transmittal of International Search Report and Written Opinion of ISA dated Apr. 27, 2009 (10 pages).

*Primary Examiner* — Phutthiwat Wongwian
*Assistant Examiner* — Marc Amar
(74) *Attorney, Agent, or Firm* — Crowell & Moring LLP

(57) ABSTRACT

A power supply device or system for aeronautics, having a hydrocarbon supply for supplying an engine with hydrocarbon fuel and a hydrogen supply having a fuel reformer for producing hydrogen from hydrocarbon fuel from said hydrocarbon supply. The hydrogen supply is connected to a hydrogen-powered fuel cell for producing electric power and to a hydrogen injecting system for injection of hydrogen into a combustion chamber of the engine. Further, the invention relates to an aircraft having an engine that can be supplied by that power supplying device or system, and to a method for operating said engine.

8 Claims, 5 Drawing Sheets

(51) Int. Cl.
  *F02C 9/28*  (2006.01)
  *F02C 3/22*  (2006.01)
  *F02C 3/30*  (2006.01)
  *F02C 9/40*  (2006.01)
  *F23R 3/06*  (2006.01)
  *F23R 3/36*  (2006.01)

(52) U.S. Cl.
  CPC . *F02C 9/28* (2013.01); *F02C 9/40* (2013.01); *F23R 3/06* (2013.01); *F23R 3/36* (2013.01); *F05D 2220/50* (2013.01); *F05D 2270/082* (2013.01); *F23R 2900/00002* (2013.01); *H01M 2250/20* (2013.01); *Y02T 50/675* (2013.01); *Y02T 50/677* (2013.01); *Y02T 50/678* (2013.01); *Y02T 90/32* (2013.01)

(56) References Cited

U.S. PATENT DOCUMENTS

| | | | |
|---|---|---|---|
| 6,199,366 B1* | 3/2001 | Murata | F02C 3/22 60/734 |
| 6,233,914 B1* | 5/2001 | Fisher | 60/780 |
| 6,450,447 B1* | 9/2002 | Konrad et al. | 244/53 R |
| 7,150,143 B2 | 12/2006 | Schick et al. | |
| 7,178,339 B2* | 2/2007 | Goldmeer et al. | 60/775 |
| 7,279,655 B2* | 10/2007 | Blutke et al. | 219/121.59 |
| 2004/0226299 A1 | 11/2004 | Drnevich | |
| 2005/0144961 A1* | 7/2005 | Colibaba-Evulet et al. | 60/780 |
| 2005/0210881 A1 | 9/2005 | Balan et al. | |
| 2006/0070383 A1 | 4/2006 | Drnevich et al. | |
| 2006/0138996 A1* | 6/2006 | Graham et al. | 320/101 |
| 2007/0089425 A1* | 4/2007 | Motter et al. | 60/775 |
| 2007/0224482 A1* | 9/2007 | Shimoi et al. | 429/33 |
| 2007/0237992 A1* | 10/2007 | Nastasi et al. | 429/13 |
| 2007/0248851 A1* | 10/2007 | Wallace et al. | 429/13 |
| 2008/0236165 A1 | 10/2008 | Baudoin et al. | |

FOREIGN PATENT DOCUMENTS

| | | |
|---|---|---|
| EP | 1 501 139 A2 | 1/2005 |
| EP | 1 582 502 A1 | 10/2005 |
| EP | 1 953 455 A1 | 8/2008 |
| GB | 2 268 694 A | 1/1994 |

* cited by examiner

METHOD FOR OPERATING A GAS TURBINE ENGINE, POWER SUPPLYING DEVICE FOR CONDUCTING SUCH METHOD AND AIRCRAFT USING SUCH METHOD

This application is a national stage of PCT International Application No PCT/EP2008/008095, filed Sep. 24, 2008, which claims priority under 35 U.S.C. §119 to European Patent Application No. 08151335.0, filed Feb. 12, 2008 and claims priority under 35 USC. §120 to U.S. patent application Ser. No. 11/861,014, filed Sep. 25, 2007, the entire disclosures of which are herein expressly incorporated by reference.

BACKGROUND OF THE INVENTION

The invention relates to a method for operating a gas turbine engine and to a power supplying device for aeronautics, having a hydrocarbon supply for supplying an engine. Further, the present invention relates to an aircraft having a gas turbine engine that can be operated according to such method and/or having such a power supplying device. Especially, the present invention refers to a reduction of gaseous emissions of gas turbine engines, especially in aeronautics.

Typical aeroplanes are using hydrocarbon fuel both for powering the engines for propelling the aeroplanes and for powering an auxiliary power unit (APU) used to produce electrical power, especially at airports. Although modern aircraft have made great moves forward in reducing emissions, still there is a high demand for a further reduction of emissions caused by such typical aeroplanes, especially at airports.

EP 1 047 144 A1, incorporated herein by reference, discloses a new power generation system and method for automotive appliances, wherein fuel cells producing electrical power are powered with hydrogen from a fuel reformer. The fuel reformer generates hydrogen out of a hydrocarbon used as main fuel for the engine. The hydrogen produced by fuel reformation is used for powering the fuel cells.

GB 1 154 521, incorporated herein by reference, discloses a method for producing hydrogen from a hydrocarbon fuel.

US 2005/0271917 A1, incorporated herein by reference, discloses an electrochemical reactor used in an APU of an aircraft for providing energy, hydrogen, oxygen and clear water.

US2007/0026268 A1, also incorporated herein by reference, discloses an aircraft using a hydrogen-powered fuel cell.

WO2006/058774, incorporated herein by reference, discloses a supply system for the energy supply in an aircraft having a fuel cell for supplying the aircraft with electrical energy. The known supply system has a first fuel reservoir for supplying the aircraft engine with engine fuel and a separated second fuel reservoir for supplying the fuel cell with fuel cell fuel.

Most aircraft are using gas turbine engines. A gas turbine engine includes a core having a compressor fixedly joined to a turbine by a core rotor extending axially therebetween. At least one combustor, for example an annular combustor or a plurality of combustor chambers distributed around the core, are disposed between the compressor and the turbine and include fuel injectors. The fuel injectors may be joined to a fuel control valve which meters fuel into the at least one combustor during operation.

The compressor includes one or more stages of circumferentially spaced apart compressor rotor blades and cooperating compressor stator vanes through which air is channelled during operation for increasing the pressure thereof. The pressurized air is discharged from the compressor and mixed with fuel in the combustor and suitably ignited for generating hot combustion gas which flows downstream therefrom and through the turbine. The turbine includes one or more stages of turbine rotor blades circumferentially spaced apart from each other, with cooperating turbine nozzle vanes expanding the combustion gas and extracting energy therefrom.

The engine also includes a suitable controller for controlling the various components thereof over a large range of rotor speed and output power.

Examples of known gas turbines which are suitable for use as aircraft engines are disclosed in U.S. Pat. No. 5,694,760, incorporated herein by reference and U.S. Pat. No. 5,732,5469, also incorporated herein as reference.

Thus, it is generally known in the art to power turbines with gases expelled from combustion chambers. These gas powered turbines can produce power for many applications such as aeronautics, but also terrestrial power plants or as power sources of ships. In the gas powered turbine the fuel is combusted in an oxygen rich environment. In the very most cases, the fuel is a hydrocarbon fuel, i. e. the fuel on the basis of hydrocarbon compounds, such as methane, natural gas, gasoline or kerosene. Generally, these combustion systems may emit undesirable compounds such as nitrous oxide compounds (NOX) and carbon-containing compounds. It is generally desirable to decrease various emissions as much as possible so that selected compounds may not enter the atmosphere. In particular, it has become desirable to reduce NOX emissions to a substantially low level.

Various attempts have been made to reduce gaseous emissions of turbine engine combustors. For example, in US 2006/0156729 A1, a catalytic combustor and method for substantially eliminating various emissions is disclosed using a catalytic structure within a combustor chamber. Within the catalyst, the temperature of the air is increased to an auto-ignition temperature which ignites a further part of the fuel that is added later. To achieve a prescribed temperature of the catalysts, hydrogen gas is used during a start-up to power the gas turbine.

Such known gas turbine engines have the disadvantage that the catalysts are heavy and take up considerable space within the combustor chamber. Hence, the whole arrangement is bulky, heavy and complicated.

Hitherto, turbine engine combustor size has been the result of a trade-off between antagonist requirements:
 a) at low turbine engine power, the relatively low speed combustion kinetics require a large combustor to mitigate un-burnt hydrocarbon and carbon monoxide emissions and maintain combustor flame stability.
 b) on the other hand, at high turbine engine power, a small combustor is desirable to minimize nitrogen oxide emissions (NOX), since NOX formation, which takes place at high temperatures, is slower than combustion.

Current turbine engine combustors are a good compromise between low and high power requirements.

However, the quest for ever more fuel-efficient turbine engines paves the way to very high bypass ratio, and very high pressure ratio turbine engines. Such turbine engines exhibit high pressure and high temperature at combustor inlets during high power operations. This is detrimental to NOX emissions. In addition, environmental concerns have led, and are likely to lead, to more and more stringent NOX certification requirements.

It is an object of the invention to reduce turbine engine combustor emissions of turbine engines, especially of an aircraft, that are operated over a large output power range.

A further object of the invention is to reduce gaseous turbine engine combustor emissions without increasing the size or weight of the combustor.

It is a further object of the invention to reduce the size and weight of the combustor without a negative effect on turbine engine combustor emissions.

It is a further object of the invention to provide gas turbine engines with a high bypass ratio and a very high pressure ratio, but low NOX emissions.

It is a further object of the invention to provide a low emission power supply that is suitable for aeronautics and has a high efficiency.

It is a further object of the invention to further reduce emissions of an aircraft especially at airports.

SUMMARY OF THE INVENTION

According to first aspect of the invention, a method is provided for operating a gas turbine engine having a compressor joined to a turbine by a core rotor, with at least one combustor disposed therebetween for receiving compressed air from said compressor and fuel for providing combustion gas to be discharged to said turbine, the method comprising supplying a hydrocarbon fuel to the combustor and injecting hydrogen into said combustor in response to a gas turbine power output level.

Thus, one aspect of the present invention is directed to a method for operating a gas turbine engine that has a compressor joined to a turbine by a core rotor and at least one combustor disposed between the compressor and the turbine. The combustor receives compressed air from said compressor and fuel for providing combustion gas to be discharged to said turbine. A hydrocarbon fuel is supplied to the combustor. Additionally, hydrogen is injected into said combustor at least during low power operations.

By injection of hydrogen, combustion kinetics is accelerated, so that the combustor size can be small even for low turbine engine power conditions without the risk of un-burnt hydrocarbon and carbon monoxide emissions. Thus, a smaller combustor size can be used without a negative effect for low turbine engine power. The smaller combustor size is advantageous for high turbine engine power conditions to minimize NOX emissions. For high power output operation and a mid-power output operation, hydrogen injection may be stopped to reduce consumption of hydrogen.

Hence, one basic idea of the invention is to control injection of hydrogen in response to a turbine power output level or turbine power output condition.

A further basic idea of the invention is to use gaseous hydrogen injection in the turbine engine combustor for low power operations. Hydrogen injection may be stopped for mid-power and high power operations.

Thanks to the gaseous hydrogen injection for low power operations, combustion kinetics is accelerated, which enables of a smaller turbine engine combustor to be used at given low power engine emissions.

As a consequence, the smaller size turbine engine combustor allows less time for NOX formation at high power, hence yielding reduced turbine engine combustor NOX emissions.

According to another aspect of the invention, hydrogen from a fuel reformer is supplied both to a fuel cell for providing electrical power and to a hydrogen injection system for injecting hydrogen into a combustion chamber of the engine. This helps to reduce the combustion chamber emissions.

Preferably, said power supply device or system is used for fuel and/or hydrogen supply to the gas turbine engine.

In an advantageous embodiment, the power supply device is equipped with a hydrogen flow control controlling the flow of hydrogen into the combustion chamber. Preferably, the flow is controlled in response to the power need of the engine. In low power conditions—for example during taxi at airports—, more hydrogen is injected. The hydrogen injection may be switched off in medium and high power conditions. The effects thereof are described in the enclosed previous application documents.

Further, water from the fuel cell may be used for water injection into the combustion chamber which may also lead to lowering of the engine emissions.

In an advantageous embodiment, a water tank is provided for receiving water from the fuel cell. Such, water produced during use of the fuel cell, e.g. at the airport when engines are not running, can be stored or buffered. Thus, for example, water can be injected into an engine independently of the operation of the fuel cell.

In a further embodiment, water from the fuel cell is used for other purposes, for example a water supply to a cabin, especially for wash rooms, or as drinking water. Also for such purposes, a water tank buffering water from the fuel cell is advantageous.

The fuel cell is preferably part of an APU (i.e. Auxiliary Power Unit) as this is in principle known from the aforementioned prior art. The fuel reformer may be off the known kind as described in the documents mentioned above. Preferably, the fuel reformer is also part of the APU, for an internal reformation of the fuel, so that the APU may be simply supplied with hydrocarbon fuel.

In a possible embodiment, the hydrogen supply comprises an auxiliary hydrogen tank. This hydrogen tank is especially useful during the start process. When the system runs, there is, under most conditions, enough hydrogen production both for powering the fuel cell as well as for H2 injection into the engine. Further, the fuel reformer may be connected to the hydrogen tank, so that hydrogen, which is used neither in the engine nor in the fuel cell, may be stored in the hydrogen tank.

Further, a battery may be present to buffer electrical power from the fuel cell. In more sophisticated embodiments the fuel reforming process will be enhanced so that there is no need for a hydrogen tank and for a battery buffer anymore.

According to an advantageous embodiment of the present invention, the gas turbine engine is operable in a power range that includes at least a high-power condition and a low-power condition. Hydrocarbon fuel is supplied to the combustor during both the high-power and low-power conditions. Hydrogen is injected into the combustor at least during the low-power condition. When turbine power output is decreased, the mass flow of hydrogen which is injected into the combustor is increased. Hence, it is ensured that more hydrogen is injected at the low-power condition, so that combustion kinetics is accelerated in said low-power condition. Less or no hydrogen is injected during the high-power condition. Hence, according to a further advantageous embodiment, the mass flow of hydrogen which is injected into said combustor is decreased as the turbine power output is increased.

Increasing of the mass flow of hydrogen can simply be done by starting the hydrogen injection from zero to a given mass flow. Hence, according to one possible embodiment of the invention, a hydrogen supply simply is switched on when changing from high-power or mid-power conditions to the low-power condition, and is switched off when changing from low-power condition to mid-power or high-power conditions.

According to a further embodiment, an actual power condition is detected and compared to a switch power level for switching on/off the hydrogen injection. Preferably, the actual power condition is determined indirectly by detecting a parameter which is related to the actual power condition. The actual power condition can be determined from the actual core flow of gases flowing through the core of the engine. However, in many gas turbine engines, core flow is not directly measured. Therefore, one suitable control parameter related to the actual power condition can be a temperature at the combustor inlet, e.g. the turbine engine combustor inlet total temperature. For example, in practical embodiments, it may be advisable to shut off gaseous hydrogen injection when the turbine engine combustor inlet total temperature exceeds a value between 450 and 550° K. In many cases, combustor inlet total temperature is also not directly measured on the turbine engine. However, a turbine engine control system can easily recalculate combustor inlet total temperature based on a turbine engine model which uses measured parameters such as turbine engine core speed and ambient conditions, for example ambient static pressure and temperature for industrial or marine turbine engines, or ambient static temperature, total pressure and total temperature for aviation turbine engines.

Examples for turbine engine control systems using a turbine engine model are given in U.S. Pat. No. 5,694,760 and U.S. Pat. No. 5,732,546, incorporated herein by reference.

A similar turbine engine control system could also be used in controlling the gaseous hydrogen flow to the turbine engine.

A low power range where hydrogen is injected can range between zero and 35% of the maximum power output. Hence, a switch power level for switching on/off the hydrogen injection can be chosen between 30% and 40% of the maximum output power level. Within the low power range between zero and the switch power level, the proportion of hydrogen can be between 5 and 15% of the total mass flow of fuel and hydrogen which is supplied to the combustor. In one embodiment, the mass flow of hydrogen can be adjusted in response to the actual power output. This can be done by using a schedule of hydrogen flow versus said actual power condition.

As mentioned before, the actual power condition can be determined indirectly by the core flow or by the total temperature at the combustor inlet that is calculated from other measured parameters.

An aircraft according to a further aspect of the invention comprises at least one gas turbine engine having a compressor joined to a turbine by a core rotor as well as at least one combustor disposed between said compressor and turbine for receiving compressed air from said compressor and hydrocarbon fuel for producing combustion gas discharged to said turbine. The aircraft according this aspect of the invention further comprises a hydrogen injection arrangement for injecting hydrogen into said combustor; and a controller for controlling said hydrogen injection arrangement in response to a power output level.

According to an embodiment of the invention, the hydrogen injection arrangement may include at least one valve which is configured at least for starting and stopping hydrogen supply to said combustor and which can be controlled by the controller for injecting hydrogen into the combustor at least during a low power condition.

The valve may be simply a shut-on/shut-off valve. However, for a better adaptation of the hydrogen consumption according to the actual power condition, a valve that is adapted to regulate or meter a mass flow of hydrogen is preferred. Such regulation or metering can be controlled by the controller in response to an increase or decrease of the actual turbine power output.

Further, it is preferred to introduce pressurized gaseous hydrogen at the turbine engine combustor inlet close to the fuel nozzle, in order to enhance turbulent mixing for homogeneous burning.

It is preferred to stop hydrogen injection for mid power and high power operation. This reduces the hydrogen consumption. Thus, less complicated and smaller equipment for storage and/or (online-)production of hydrogen can be used. Further, at medium to high power, and for engines operating with a rich primary zone, there will be no particular advantage in additional injection of hydrogen. Actually, there could be the risk of operating the turbine engine combustor at a leaner condition which could lead to an increase in NOX emissions.

For example, a low-power operation can be defined between zero and approximately 35% of maximum power output, e. g. between zero and about 35% maximum core flow. Mid-power operation can be defined between 35% and 70% of maximum output power or maximum core flow. High-power operation can be defined above 70% maximum output power or core flow.

The invention can be applied to gas turbine engines for aeronautics, marine applications and industrial power production. However, the invention is most particularly appropriate for aviation, because aircraft turbine engines are routinely operated at low power for extended periods of times. For example, aircraft engines run at low power while taxiing. Hence, the invention is particularly useful for reducing gaseous emissions of aircraft turbines at airports or the like.

Furthermore, the natural antagonist requirements for low carbon monoxide, unburnt hydrocarbons, and low NOX, are particularly acute for aviation.

However, the invention can also be used for other applications of gas turbine engines. For example, up to the present, industrial power generating gas turbine engines have normally been operated at a single point of high power operation, namely at peak efficiency. However, such gas turbine engines are widely used in power plants for generating electrical power. Since more and more alternative power sources are used in electrical power generation, the changes in the power outputs of such regenerative energy sources (wind, solar, water energy) must be compensated. This can be done by operating gas turbine engines at different power levels. Thus, it is more and more likely that industrial gas turbine engines will also be operated at different output power level for compensating the fluctuation in electrical power supply from regenerative energy sources. Thus, the invention will become more and more important for other applications, too.

Other objects, advantages and novel features of the present invention will become apparent from the following detailed description of the invention when considered in conjunction with the accompanying drawings.

DETAILED DESCRIPTION OF THE INVENTION

Figure 1:
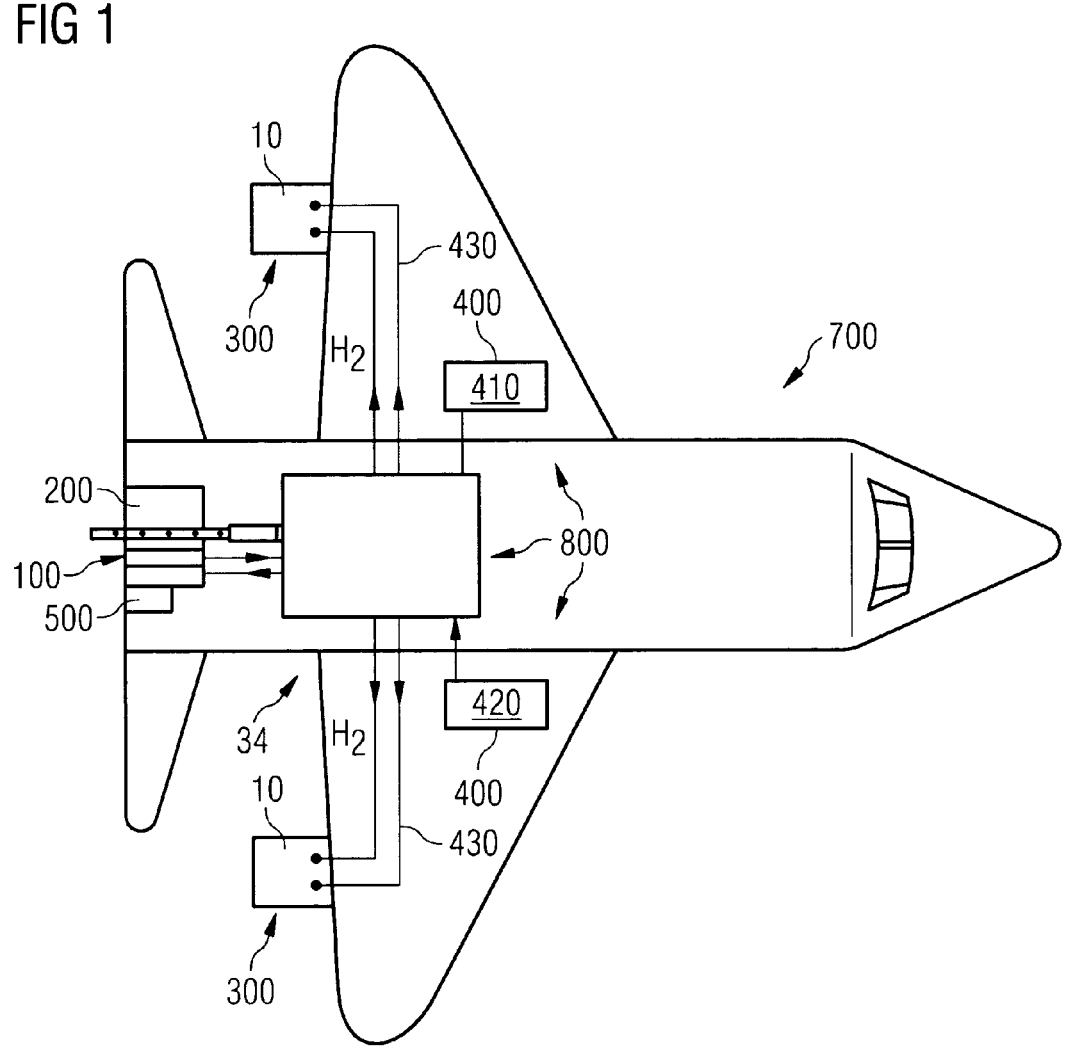
FIG. 1 is a schematic view of an airplane as example for an aircraft, having a plurality of engines and a power supply system for the energy supply.

FIG. 1 shows an aircraft 700, here in form of an airplane, having engines 300 and a power supply device 800.

The engines 300 are adapted for propulsion of the aircraft 700. The engines 300 and a turbine control system for controlling the engines 300 will be described in greater detail further below.

Figure 2:
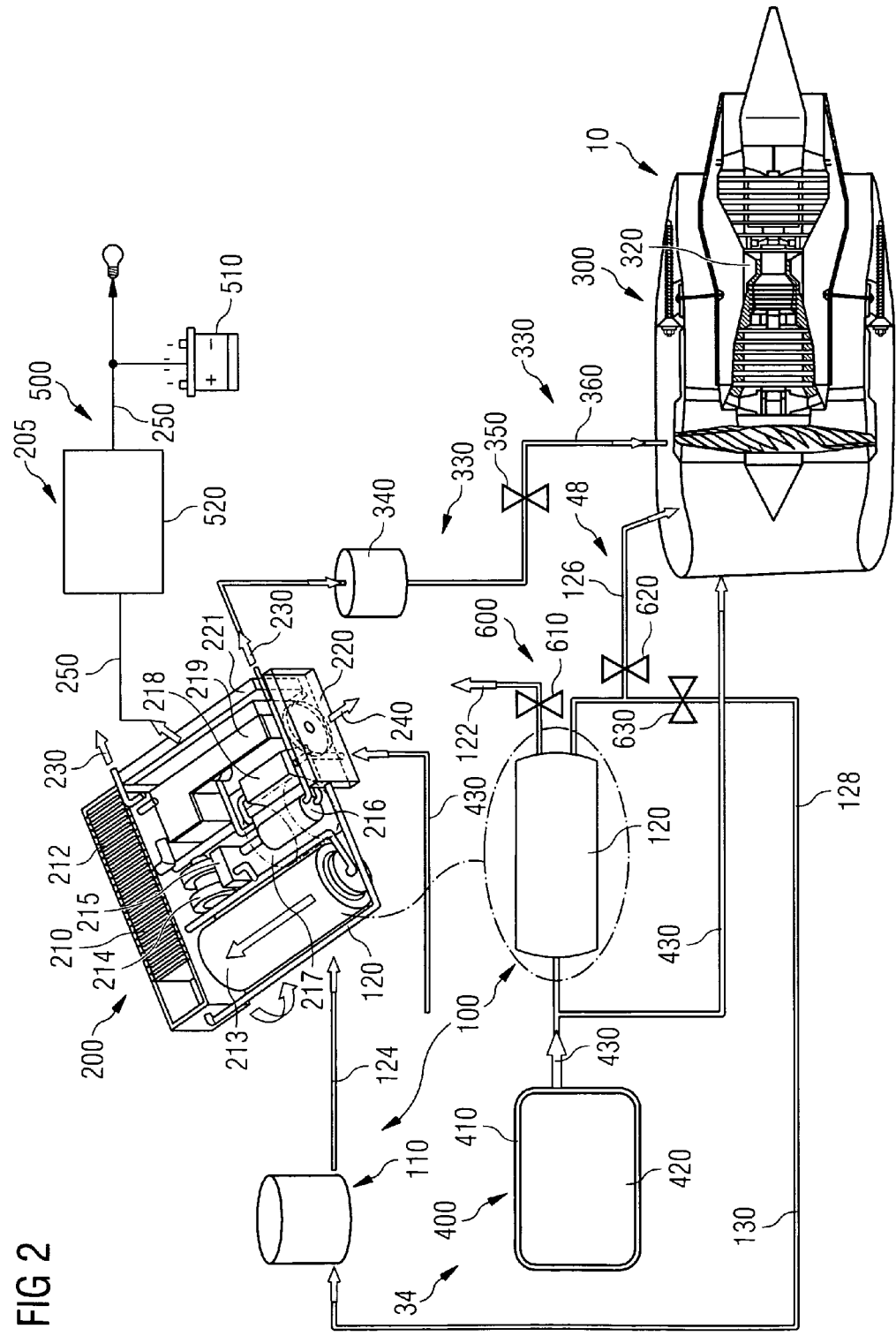
FIG. 2 is a schematic view of a power supply system for the energy supply in an aircraft, especially an airplane.

In the following the power supply device 800 will be explained with reference to FIG. 2. FIG. 2 shows a schematic overview of the power supply device 800 of the aircraft 700 shown in FIG. 1. The power supply device 800 comprises a fuel supply arrangement 34 and an auxiliary power arrangement 205. The fuel supply arrangement 34 includes a hydrogen supply 100 and a hydrocarbon supply 400. The auxiliary power arrangement 205 includes an auxiliary power unit, in the following referred to as APU 200 and an electric system 500.

In the present example, the hydrocarbon supply 400 has one or several kerosene tanks 410 including a main airplane tank 420 for supply of kerosene to the engines 300.

The hydrogen supply 100 has a hydrogen tank 110 and a fuel reformer 120 as well as a hydrogen flow control 600 having several control means, here indicated by valves 610, 620, 630.

The fuel reformer 120 generates hydrogen out of a hydrocarbon from the hydrocarbon supply 400. In the present example, hydrogen is generated from kerosene 430. The fuel reformer 120 is allocated to the APU 200 and may be part thereof. The APU 200 is equipped with a fuel cell 210 running with hydrogen generated by the fuel reformer 120.

In the present example, the APU 200 comprises the fuel reformer 120, the fuel cell 210 having a fuel cell stack 212, a CO purification means 213, a compressor, e.g., formed by a turbine 214, a heat exchanger 215, a tail gas burner 216, a fuel/water vaporizer 217, a desulphuriser 218, a water tank 219, a cooling system 220 and power controls 221.

The fuel cell 210 uses hydrogen 122 from the fuel reformer 120 for generating electrical energy for the electric system 500. The fuel cell 210 can be formed in different ways. In one embodiment, the fuel cell 210 is a PEM fuel cell (PEM means Proton Exchange Membrane). In another embodiment, the fuel cell 210 is a SOFC (Solid Oxide Fuel Cell).

The fuel cell APU 200 produces water 230, heat 240, and electric power 250, all for use in the aircraft.

The desulphuriser 218 is arranged upstream of the fuel reformer 210 for removing sulphur from the hydrocarbon. The desulphurization is different if the PEM fuel cell or the SOFC is used. The SOFC is more lenient to sulphur as compared to the PEM fuel cell.

The hydrogen tank 110 is an auxiliary hydrogen tank having a small volume. Such tanks with small volume may be needed with a PEM fuel cell to start an energy supply process. The hydrogen tank 110 is part of a fuel tank inerting system.

In case of need of a fast start before the fuel reformer 120 kicks in hydrogen 122 in sufficient quantity, hydrogen 124 is fed from the hydrogen tank 110 directly to the fuel cell 210.

The hydrogen tank 110 includes, for example, several gas bottles (not shown) for storing hydrogen. Via a hydrogen back duct 130, hydrogen 128 from the fuel reformer 120 can be fed to the hydrogen tank 110. Thus, the hydrogen tank 110 works as a buffer tank. In further embodiments (not shown), especially those using SOFC, the hydrogen tank 110 can be omitted.

The power supply device 800 further includes a hydrogen injection system or arrangement 48 for injecting hydrogen into combustion chambers 320 of the engines 300 and a water injection device 330 for injecting water into the engines 300.

The water injecting device 330 includes a water tank 340 for storing or buffering water 230 produced by the fuel cell 210 for an injection of water 230 into the engine 300 and several control elements (represented by a controllable water valve 350) for controlling the water injection 360.

The hydrogen injection arrangement 48 and the operation thereof will be described in detail further below.

The hydrogen supply system 100 further has the hydrogen flow control 600 controlling the supply of hydrogen 122, 124 to various elements of the aircraft 700, especially to the engines 300, to the fuel cell 210 and/or to the auxiliary hydrogen tank 110. The hydrogen control 600 includes a first valve element 610 for controlling the flow of hydrogen 122 to the fuel cell, a second valve element 620 for controlling a flow of hydrogen 126 to the engine 300, and a third valve element 630 for controlling a flow of hydrogen 128 to the hydrogen tank 110 via the hydrogen back duct 130.

The electric system 500 includes power electronics 520 for adaptation of the electrical power produced by the fuel cell 210 for use in the aircraft 700 and eventually a battery buffer 510.

As engines 300, preferably, gas turbine engines 10 are used which are described in detail below with reference to the FIGS. 3, 4, and 5.

Figure 3:
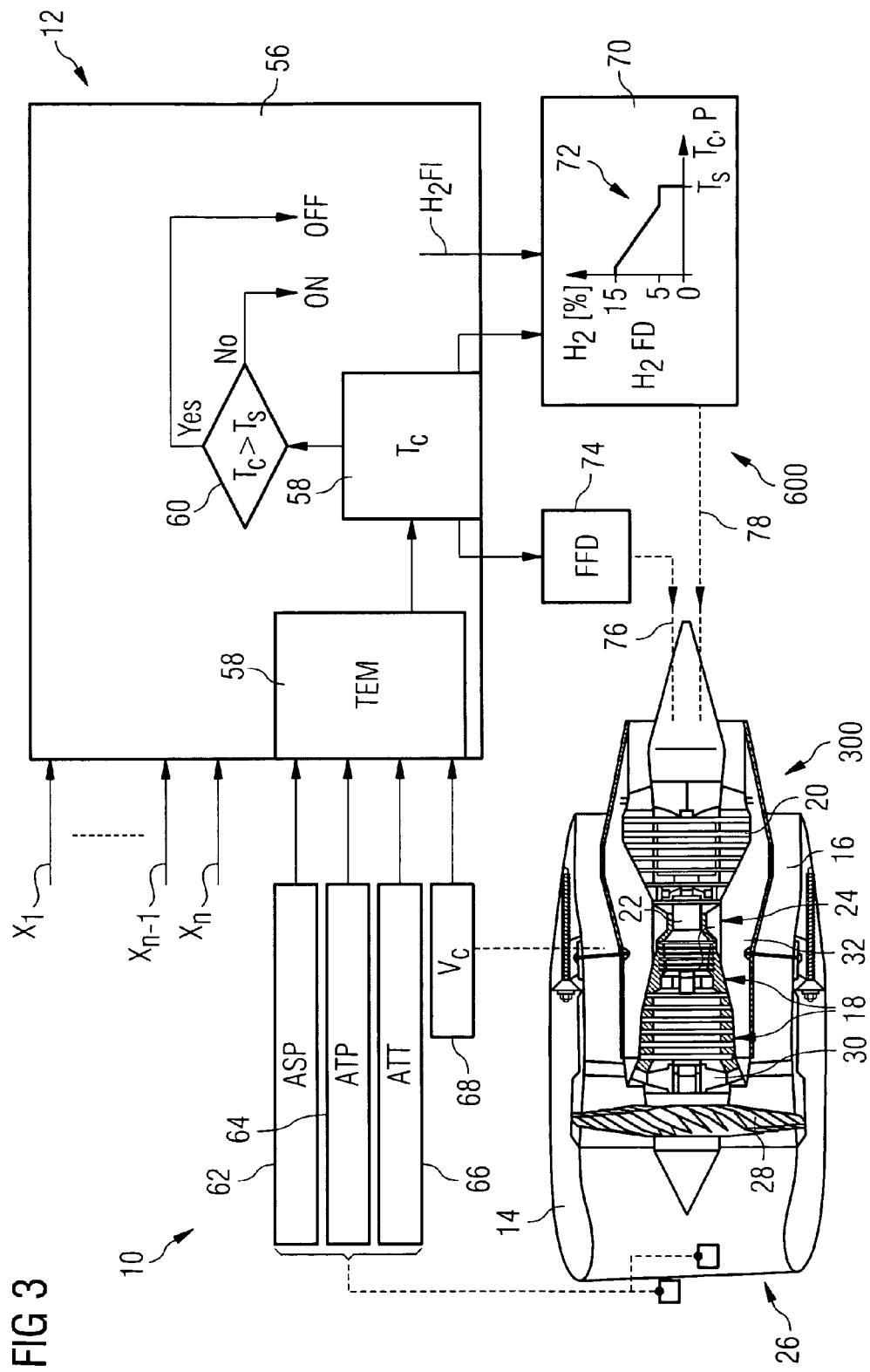
FIG. 3 is a schematic illustration of an aviation gas turbine engine having a turbine engine control system.

FIG. 3 shows a gas turbine engine 10 with a turbine engine control system 12. The gas turbine engine 10 is adapted to be used as an aviation turbine engine and includes an outer housing 14 with a bypass duct 16; a compressor 18; a turbine 20; a core rotor 22 joining the compressor 18 and the turbine 20; and an annular combustor 24 between the compressor 18 and the turbine 20. At an inlet 26 of the housing 14, a fan 28 is connected to the core rotor 22. The compressor 18, the turbine 20 and the core rotor 22 form the core 30 of the gas turbine engine 10 which is enclosed by an inner housing 32. The inner housing 32 is surrounded by the bypass duct 16.

The compressor 18 compresses air entering the housing 14 through the inlet 26 and discharges the pressurized air to the combustor 24. In the combustor 24, the pressurized air is mixed with fuel. The air/fuel mixture is ignited to generate hot combustion gas which flows downstream from the combustor through the turbine 20. The turbine 20 extracts energy from the expanding combustion gas.

Figure 4:
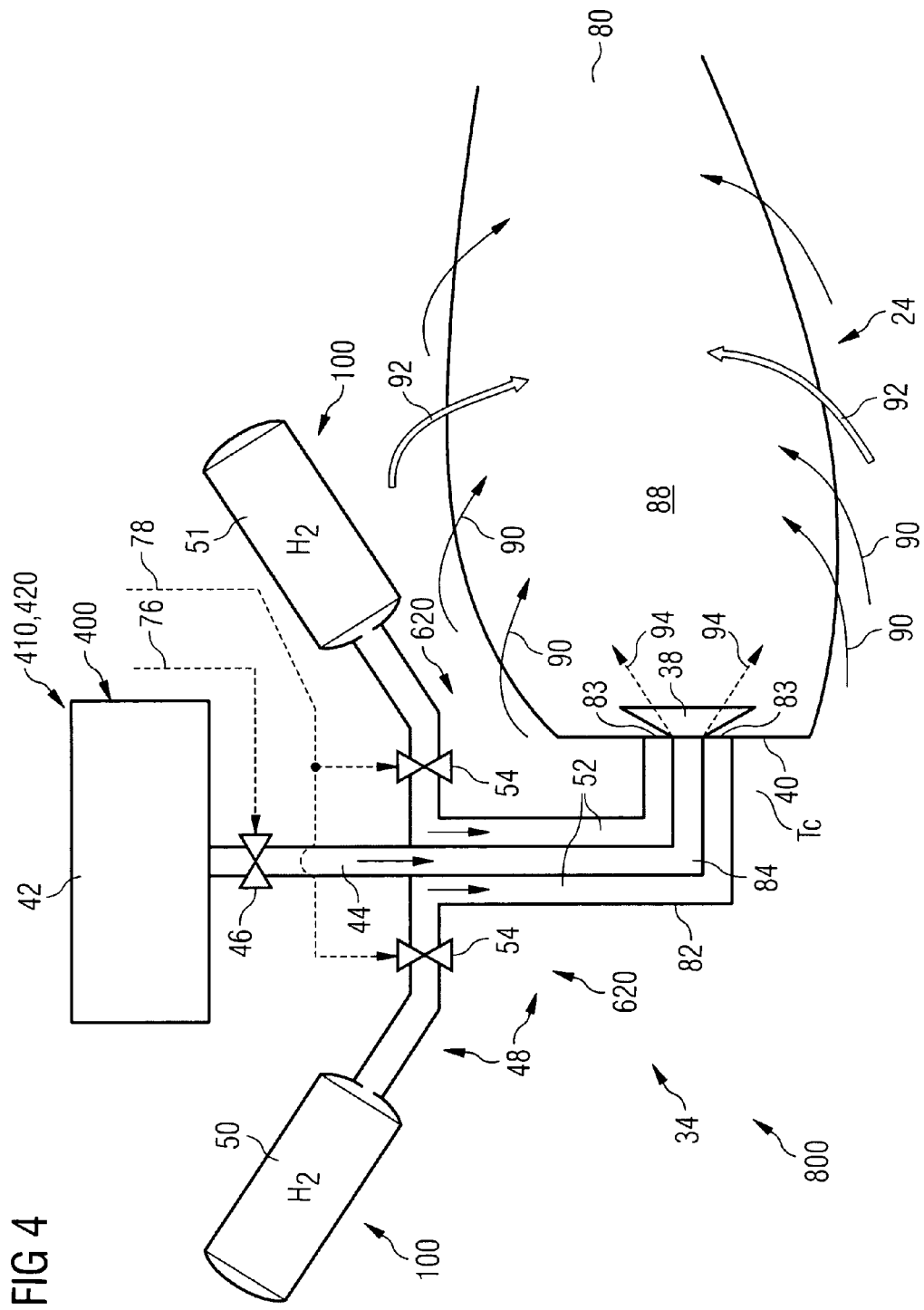
FIG. 4 is a schematic view illustrating a low-power operation of a combustor of said gas turbine engine of FIG. 3 with a fuel supply and a hydrogen injection arrangement for injecting hydrogen during the low-power operation.
Figure 5:
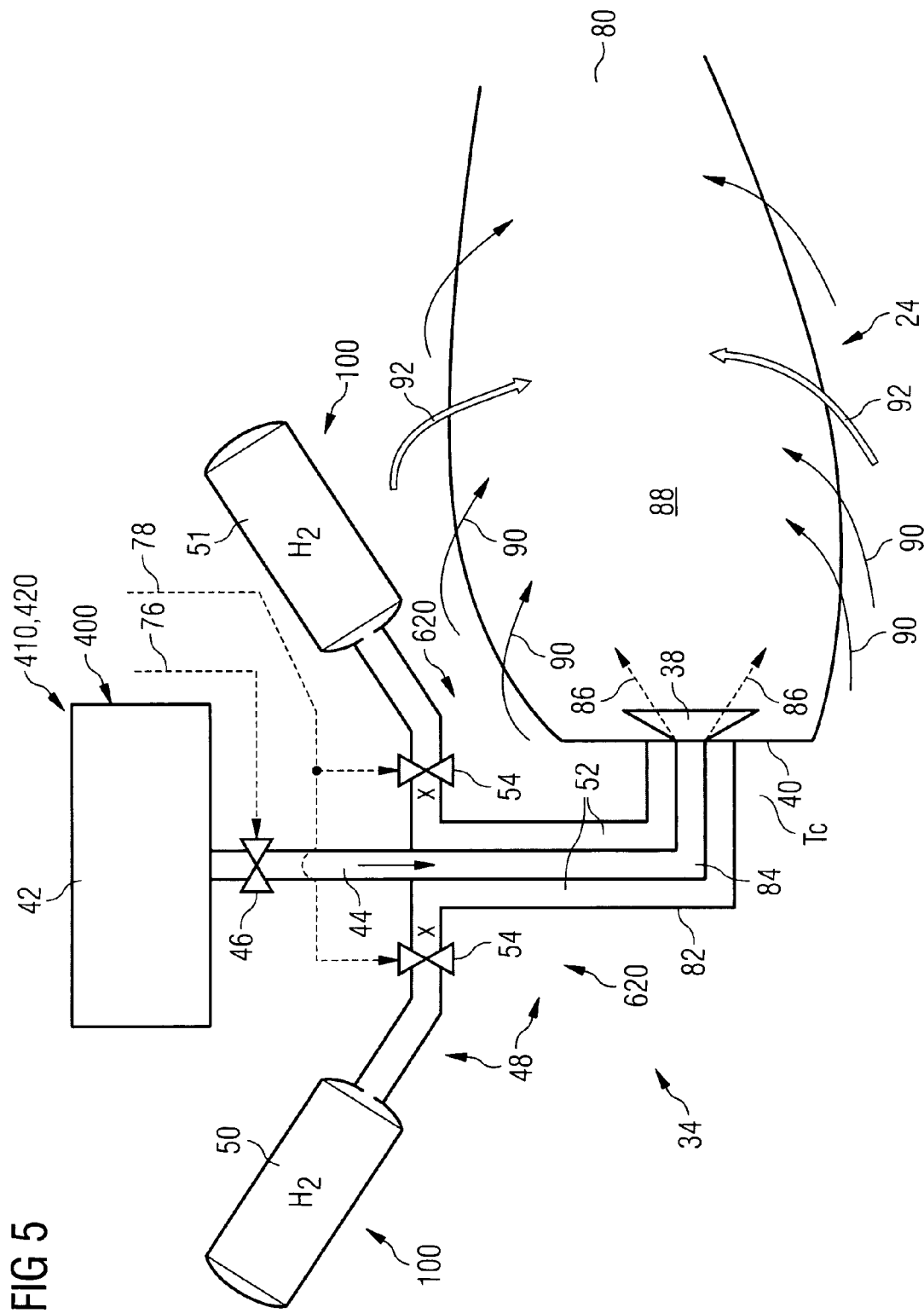
FIG. 5 is a schematic view similar to FIG. 4 illustrating a high power operation of the combustor.

The combustor 24 is schematically shown in FIGS. 4 and 5 together with the fuel supply arrangement 34. The fuel supply arrangement 34 includes the hydrocarbon supply 400 for supplying hydrocarbon fuel to a nozzle 38 at a combustor inlet 40. The hydrocarbon supply 400 further includes at least one fuel tank 42, e.g., the kerosene tank 410 and/or the main aircraft tank 420, to be filled with the hydrocarbon fuel, a fuel duct 44 and a first controllable valve 46 for metering hydrocarbon fuel into the combustor 24.

The fuel supply arrangement 34 further includes the hydrogen-injection arrangement 48 for injecting gaseous hydrogen into the combustor. The hydrogen-injection arrangement 48 includes a source of gaseous hydrogen, here represented for example by gas containers 50, 51; hydrogen duct 52; and second controllable valves 54 for closing and opening the hydrogen ducts 52. In the preferred embodiment, the second controllable valves 54 are further adapted to meter hydrogen into the combustor 24 by regulating the hydrogen mass flow through the respective hydrogen duct 52. The hydrogen ducts 52 are connected to the combustor inlet 40 for injecting pressurized gaseous hydrogen in close proximity to the nozzle 38.

Referring now to FIG. 3 again, the turbine engine control system 12 has a controller 56 for controlling the hydrogen injection in response to an power output condition of the gas turbine engine 10. The controller 56 further controls the hydrocarbon fuel supply 36 for supplying fuel according to the needs.

The controller 56 includes an actual power detector 58 for detecting an actual power condition and comparing means 60 for comparing said actual power condition with a preset parameter indicating a switch power level. The actual power detector 58 and the comparing means 60 can—as well as further portions of the controller or the turbine engine control system 12—be implemented as software loaded into a microprocessor (not shown) of the controller 56.

The actual power detector 58 is connected to a first ambient pressure sensor 62 for sensing an ambient static pressure ASP at the inlet 26 of the gas turbine engine 10, with a second ambient pressure sensor 64 for detecting an ambient total pressure ATP at the inlet 26 of the gas turbine engine 10, with an ambient temperature sensor 66 for detecting an ambient total temperature ATT at the inlet 26 of the gas turbine engine 10, and with a speed sensor 68 for detecting a core speed vC at which the core rotor 22 rotates. The actual power detector 58 calculates a calculated combustor inlet total temperature TC which is a parameter representing the actual power output according to a known turbine engine model TEM from the outputs of the sensors 62, 64, 66 and 68.

The comparing means 60 compares the calculated combustor inlet total temperature TC with a switch temperature TS which is a parameter representing a switch power level dividing a low-power condition from a mid-power condition.

The controller 56 controls the second controllable valves 54 so that the valves are in a closed condition, when the calculated combustor inlet total temperature TC is greater than the switch temperature TS. When the calculated combustor inlet total temperature TC is smaller than or equal to the switched temperature TS, the controller 56 controls the second controllable valves 54 so that the hydrogen ducts 52 are open. Thus, the gaseous hydrogen flow H2F1 is controlled in response to an actual power condition.

The calculated combustor inlet total temperature TC is further supplied to a gaseous hydrogen flow demand control unit 70 regulating the gaseous hydrogen flow demand H2FD during the low-power operation according to a schedule 72. The schedule 72 is a predetermined function of the desired mass flow of hydrogen H2 versus the calculated combustor inlet total temperature TC which represents the actual power output level P.

Further, the calculation of the combustor inlet total temperature TC according to the turbine engine model TEM is used to control the fuel flow demand FFD. Hence, the calculated combustor inlet total temperature TC is supplied to a fuel flow demand control unit 74 for controlling the fuel flow demand in response to the inlet total temperature TC representing the actual power output level P.

The fuel flow demand control unit 74 is connected to the first controllable valves 46 via a first line 76. The gaseous hydrogen flow demand control unit 70 is connected to the second controllable valves 54 via a second line 78.

Referring now again to FIGS. 4 and 5, the combustor 24 has a size, for example a length between the combustor inlet 40 and the combustor exit 80 or more particularly a volume of the combustion chamber, which size is smaller than that of combustors of similar known gas turbine engines. For example, the size is reduced by approximately 5 to 15%, probably by about 10%.

FIG. 5 shows an operation at mid-power or high-power condition. In a power output range between a switch power level, represented by the switch temperature TS in FIG. 3, and the maximum power output, the controller 56 keeps the second controllable valves 54 in a closed state. No gaseous hydrogen is injected at the combustor inlet 40. A hydrogen injector 82 is shut off. A fuel injector 84 injects hydrocarbon fuel through the nozzle 38 into the combustor inlet 40. A mixture of fuel and air 86 is present in a primary zone 88 of the combustor 24. This mixture—fuel and air 86—is ignited in a known way. The gases are mixed with cooling air 90, and further downstream in the combustor 24 with dilution air 92. Due to the reduced combustor size, the length time of the air stays within the combustor 24 is shortened, so that NOX emissions are lowered compared to those of the usual combustor sizes.

In FIG. 4, an operation of the combustor 24 at low-power condition is illustrated. The calculated combustor inlet total temperature TC is equal to or smaller than the switch temperature TS. This indicates that the actual power output level P is smaller than a switch power level dividing a low-power subrange of the whole power output range from mid-power and low-power operations.

In low power operations, the controller 56 opens the second controllable valves 54. The hydrogen injector 82 is active and conducts hydrogen via at least one hydrogen nozzle 83 into the combustor 24. Thus, for low-power operations, pressurized gaseous hydrogen is introduced at the turbine engine combustor inlet 40, close to the fuel nozzle 38 in order to enhance turbulent mixing for homogeneous burning.

In the turbine engine combustor primary zone 88, hydrogen burns and accelerates combustion kinetics before dilution of the gases by the dilution air 92. Thus, the emissions of un-burnt hydrocarbon and carbon monoxide are minimized. The introduction of a pressurized gaseous hydrogen leads to a homogeneous mixture of fuel, air and hydrogen 94 in the primary zone 88.

During the low-power operation, the mass flow of hydrogen is controlled by the gaseous hydrogen flow demand control unit 70 according to the given schedule 72. The lower the actual power output level is, the more hydrogen is injected. The mass flow of hydrogen is, for example, regulated between 15% and 5% of the total mass flow of hydrocarbon fuel and hydrogen that is injected into the combustor 24.

The fuel flow demand FFD is controlled over the whole power range—for low-power, mid-power and high-power operations—by the fuel flow demand control unit 74.

For mid-power or high-power operations, pressurized gaseous hydrogen can be turned off, as illustrated in FIG. 5, for instance for turbine engine combustors 24 the primary zone 88 of which is rich in fuel at mid-power or high-power operations.

In further embodiments, having turbine engine combustors that are lean in fuel at mid-power or high-power operations, gaseous hydrogen injection may be maintained, for example with a lower mass flow, to get even leaner combustor operation, hence further reducing NOX. However, stopping hydrogen injection for mid power and high-power operations is preferred for minimizing the quantity of gaseous hydrogen needed at overall system level. This could for instance minimize the required size of gaseous hydrogen tanks such as the gas containers 50, 51. Therefore, it is preferred to stop gaseous hydrogen as quickly as possible.

The schedule 72 can be achieved by experiments for minimizing un-burnt hydrocarbons and carbon monoxide emission at a given smaller combustor size for different power output levels in the low power subrange.

Based on the experience of the inventors, the following design factors can be quoted: 10% gaseous hydrogen mass flow for low-power operation would enable combustor size (volume) to be reduced by about 15%, which in turn would reduce the NOX emissions index by about 14%. The lower turbine engine power is, the more useful gaseous hydrogen injection will be.

At medium to high power, and for engines operating with rich primary zone, hydrogen injection will not lead to a particular advantage. There could also be a risk of operating the turbine engine combustor a little leaner, with an associated NOX penalty.

In a further practical embodiment, a low-power condition can be defined as being below about 35% maximum core flow. Mid-power operation would be between about 35% and about 70% maximum core flow. For low-power operations, 5 to 15% gaseous hydrogen mass flow could be injected, the other 95 to 85% being hydrocarbon fuel flow. For the other modes, gaseous hydrogen mass flow is preferred to be zero. If the gas turbine engine 10 is used as an aircraft engine, pressurized gaseous hydrogen is available from the aircraft. In the example of FIG. 4, 5 exchangeable gas containers 50, 51 are used. In further embodiments (not particularly shown) the hydrogen could be supplied from a fuel reform or from pyrotechnics means.

When the gas turbine engine 10 is used as engine 300 in the aircraft 700, the fuel supply arrangement 34 is part of the power supply device 800 as shown in FIG. 2. The hydrocarbon fuel supply 36 is formed by the hydrocarbon supply 400, and the fuel tank 42 is the kerosene tank 410, 420. Instead of the gas containers 50, 51, the hydrogen supply 100 with the fuel reformer 120 is used. The second valve element 620 shown in FIG. 2 includes the controllable valves 54 shown in FIGS. 4 and 5.

The invention has been explained with an example of a gas turbine used as an engine of an aircraft. The invention is particularly appropriate for aviation, because aircraft turbine engines are routinely operated at low power for extended periods of time. As an illustration, the engine certification landing and take-off cycles include 26 minutes taxi with engines at low power.

However, the invention is not restricted to aeronautics. The invention could also be used for marine turbine engines or industrial turbine engines.

The H2 injection according to the invention can reduce HC and CO emissions at given combustor volume—with constant NOX emissions, or reduce combustor volume—hence reducing NOX emissions—at constant HC and CO emissions. It is preferred to follow the second path, which is more interesting since NOX is more critical than HC and CO.

As indicated above, "low-power", "mid-power" and "high-power" operations can be defined in terms of percentage of maximum core flow. This is correct, and applies to any kind of gas turbine engine applications—industrial, marine or aviation applications. However, core flow is not directly measured on most turbine engines, and therefore cannot be used as a direct control parameter to switch on/off gaseous hydrogen injection.

It is difficult to give precise switch values, as those will depend on the type of turbine engine application and on the particular design of the gas turbine. Switch levels can easily be optimized by experiments.

In particular, the switch values are different for different applications. Industrial turbine engines are almost always operated at a single point of high power operation, especially at peak efficiency, without transience. It is likely that, in the future, gas turbine engines at power plants will be more and more used to compensate for fluctuations in electrical power generated from regenerative energy sources. Hence, it is more likely that industrial gas turbine engines will be operated over a larger power output range than before. Hence, the invention will be more and more interesting also for industrial power generating gas turbine engines. Aviation turbine engines are already operated in all conditions over a wide power output range with strong requirements for nervous transience. Hence, aviation turbine engines demand much more in terms of operability requirements. Marine turbine engines sit in the middle between industrial turbine engines and aviation turbine engines.

In the aforementioned embodiment, the turbine engine combustor inlet total temperature is chosen as the switch parameter for controlling switching on/off gaseous hydrogen injection. In a practical embodiment, the gaseous hydrogen injection is shut off when the turbine engine combustor inlet total temperature exceeds a switch temperature value of between 450 and 550° K. A precise value of such a switch temperature would depend on the application. Combustor inlet total temperature is not directly measured on most turbine engines either, and therefore cannot be used as a direct control parameter to switch on/off the gaseous hydrogen injection. However, it is already known that turbine engine control systems re-calculate combustor inlet total temperature based on a turbine engine model which uses measured parameters such as turbine engine core speed and ambient conditions. Such ambient conditions can be or include ambient static pressure and temperature for industrial or marine turbine engines; and ambient static pressure, total pressure and total temperature for aviation turbine engines.

In addition, the turbine engine control system 12 controls the fuel flow to the turbine engine. The same turbine engine control system 12 could also control the gaseous hydrogen flow to the turbine engine, as is shown in FIG. 3.

The invention has been explained with reference to preferred embodiments which are given as examples, only. However, the invention is not limited thereto. For example is it also possible to use a plurality of combustors arranged around the core rotor instead of using a single annular combustor.

By combining the hydrogen injection arrangement 48 with said APU 200 equipped with fuel cells 210, both high efficiency ancillaries and low emission engines can be provided. All the hydrogen can be provided by a fuel reformation in the fuel reformer 120.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 gas turbine engine
12 turbine engine control system
14 housing
16 bypass duct
18 compressor
20 turbine
22 core rotor
24 combustor
26 inlet
28 fan
30 core
32 inner housing
34 fuel supply arrangement
38 nozzle
40 combustor inlet
42 fuel tank
44 fuel duct
46 first controllable valve
48 hydrogen injection arrangement
50, 51 gas container
52 hydrogen duct
54 second controllable valve
56 controller
58 actual power detector
60 comparing means
62 first ambient pressure sensor
64 second ambient pressure sensor
66 ambient temperature
68 core speed sensor
70 gaseous hydrogen flow demand control unit
72 schedule
74 fuel flow demand control unit
76 first line
78 second line
80 combustor exit
82 hydrogen injector
84 fuel injector
86 fuel and air
88 primary zone
90 cooling air
92 dilution air
94 fuel, air and hydrogen
100 hydrogen supply
110 hydrogen tank
120 fuel reformer
122 hydrogen (to fuel cell from fuel reformer—internal reforming)
124 hydrogen (from hydrogen tank)
126 hydrogen (to the engine—$H_2$ injection)
128 hydrogen (to the hydrogen tank)
130 hydrogen back duct
200 APU
205 auxiliary power arrangement
210 fuel cell
212 (fuel cell) stack
213 CO purification means
214 compressor/turbine
215 heat exchanger
216 tail gas burner
217 fuel/water vaporizer
218 desulphuriser
219 water tank
220 cooling system
221 power controls
230 water
240 heat
250 electric power
300 engine
320 combustion chamber
330 water injecting device
340 water tank
350 controllabel water valve
360 water injection
400 hydrocarbon supply
410 kerosene tank
420 main airplane tank
430 kerosene
500 electric system
510 battery buffer
520 power electronics
600 hydrogen flow control
610 first valve element
620 second valve element
630 third valve element
700 aircraft
800 power supply device
P power output level
ASP ambient static pressure
ATP ambient total pressure
ATT ambient total temperature
$v_C$ core speed
TEM turbine engine model
$T_C$ calculated combustor inlet total temperature
$T_S$ switch temperature
$H_2Fl$ gaseous hydrogen flow
$H_2FD$ gaseous hydrogen flow demand
FFD fuel flow demand
$X_1, \ldots, X_{n-1}, X_n$ other measured parameters

The invention claimed is:

1. An Aircraft having a power supply device, the aircraft comprising:
   a controller of the aircraft;
   at least one gas turbine engine having a compressor joined to a turbine by a core rotor;
   a combustion device that is arranged between the compressor and the turbine to receive compressed air from the compressor and a hydrocarbon fuel to produce combustion gases discharged to the turbine;
   a hydrogen injection arrangement that is configured to inject hydrogen into the combustion device, wherein the engine is operable in a power range having at least one of a low power condition and a high power condition, the power supply device is configured to supply the fuel to the combustion device during the low power and high power conditions, the controller is configured to control the hydrogen injection arrangement in response to a power level of the at least one gas turbine engine, the hydrogen injection arrangement includes at least one valve that is configured to at least boot and stop the hydrogen supply to said combustion device, the controller is further configured to detect the low power condition and the high power condition, and is further configured, in response to a detected low power condition to inject hydrogen into the combustion device at least during the low power condition, the at least one valve is configured to regulate a mass flow of hydrogen to be injected into the combustion device, the controller is configured to detect a decrease in turbine output power and to control the at least one valve, in response to the detected decrease in the turbine output power, to increase the mass flow of hydrogen to the combustion device when the output power of the turbine is reduced, the controller is further configured to detect a change from the low power condition to the high power condition and to control the at least one valve in response to this detection to thereby stop injection of the hydrogen into the combustion device, and the controller is further configured to detect a change from the high power condition to the low power condition and to control the at least one valve in response to the detected change from the high power condition to the low power condition to boot injection of hydrogen.

2. The aircraft according to independent claim 1, wherein the controller is configured to detect an increase in power output of the turbine and to control the at least one valve, in response to the detected increase in power output of the turbine, to decrease the mass flow to the combustion device when the power output of the turbine is increased.

3. The aircraft according to claim 2, wherein the hydrogen injection arrangement comprises a source of hydrogen gas under pressure that is connected to a power supply unit having a supply of hydrocarbons for energizing the least one gas turbine engine with a hydrocarbon fuel and a hydrogen supply having a fuel reformer for generating hydrogen from hydrocarbon fuel from said supply of hydrocarbons, wherein the hydrogen supply is connected to a hydrogen fuel cell to produce electric power and the injection system for injecting hydrogen into the combustion device.

4. The aircraft according to claim 3, further comprising a stack that is configured to be supplied with water and is connected to a water injection unit that injects water into the least one gas turbine engine.

5. The aircraft according to claim 4, wherein the controller comprises an actual power detector configured to detect an actual power condition and a comparing unit connected to the actual power detector and configured to compare the actual power condition with a switch power level dividing the low power condition from the high power condition.

6. The aircraft according to claim 5, wherein the actual power detector is connected to: an ambient pressure sensor to detect an ambient pressure, a room temperature sensor to detect a room temperature, and a speed sensor to detect an engine speed.

7. The aircraft according to claim 6, wherein the actual power detector comprises a calculating unit that is configured to calculate an inlet temperature (Tc) of the combustion device from outputs of the ambient pressure sensor, the ambient temperature sensor and the speed sensor.

8. The aircraft according to claim 7, wherein the comparing unit is configured to compare the output of the calculating unit with a switching temperature (Ts) representing a switch in power condition.

* * * * *